United States Patent [19]

Andricacos et al.

[11] Patent Number: 5,312,532

[45] Date of Patent: May 17, 1994

[54] MULTI-COMPARTMENT ELETROPLATING SYSTEM

[75] Inventors: Panayotis Andricacos, Croton-on-Hudson, N.Y.; Moritz Branger, Los Altos; Robert M. Browne, San Jose, both of Calif.; John O. Dukovic, Pleasantville, N.Y.; Benjamin W. B. Fu, Cupertino; Robert W. Hitzfeld, San Jose, both of Calif.; Matteo Flotta, Mahopac, N.Y.; Donald R. McKenna, San Jose, Calif.; Lubomyr T. Romankiw, Briarcliff Manor, N.Y.; Saeed Sahami, San Jose, Calif.

[73] Assignee: International Business Machines Corporation, Armonk, N.Y.

[21] Appl. No.: 6,070

[22] Filed: Jan. 15, 1993

[51] Int. Cl.⁵ .................. C25D 17/02; C25D 17/10; C25D 21/10; C25D 21/12

[52] U.S. Cl. .................. 204/231; 204/267; 204/269; 204/273; 204/284; 204/DIG. 7; 204/270

[58] Field of Search .............. 204/231, 267, 269, 270, 204/273, 284, DIG. 7, 228

[56] References Cited

U.S. PATENT DOCUMENTS

| | | | |
|---|---|---|---|
| 2,044,415 | 6/1936 | Yates | 204/231 X |
| 3,652,442 | 3/1972 | Powers et al. | 204/273 |
| 3,862,891 | 1/1975 | Smith | 204/DIG. 7 |
| 3,971,710 | 7/1976 | Romankiw | 205/118 X |
| 4,049,530 | 9/1977 | Tokumoto et al. | 204/273 |
| 4,102,756 | 7/1878 | Castellani et al. | 204/273 X |
| 4,244,788 | 1/1981 | Faulkner | 205/50 X |
| 4,619,749 | 10/1986 | Nusbaum | 204/273 X |
| 4,686,014 | 8/1987 | Pellegrino et al. | 205/99 |
| 4,692,222 | 9/1987 | Pellegrino et al. | 205/125 |
| 4,695,351 | 9/1987 | Mallary | 205/50 |
| 4,772,371 | 9/1988 | Lace et al. | 204/211 |
| 4,806,224 | 2/1989 | Bruun et al. | 204/273 X |
| 4,906,346 | 3/1990 | Hadersbeck et al. | 204/238 |
| 4,933,061 | 6/1990 | Kulkarni et al. | 204/269 X |
| 5,024,746 | 6/1991 | Stierman et al. | 204/297 X |
| 5,078,852 | 1/1992 | Yee et al. | 204/297 R |
| 5,100,516 | 3/1992 | Nishimura et al. | 204/198 X |

OTHER PUBLICATIONS

Bischoff, "Electrochemical Deposition Requirements for Fabricating Thin Film Recording Heads," Magnetic Materials Processes & Devices vol. 90.3.

Berger et al., IBM Technical Disclosure Bulletin, vol. 23, 201 (1980).

*Primary Examiner*—Donald R. Valentine
*Attorney, Agent, or Firm*—Ratner & Prestia

[57] ABSTRACT

A multi-compartment electroplating system for electroplating two or more objects simultaneously such that the electrodeposited material is substantially uniform in thickness and composition. Electroplating solution is circulated between a reservoir and a multi-compartment tank which has one cathode-paddle-anode (CPA) assembly for each compartment. Each CPA assembly has an anode, a cathode adapted for holding a wafer and employing a single thieving electrode which covers all of the floor of the compartment not covered by the wafer, and a paddle. Also included is a cover which houses a single linear motor for driving all of the paddles in synchrony.

21 Claims, 9 Drawing Sheets

COMPARTMENT A
1.908 μm
17.92 % Fe

COMPARTMENT B
1.863 μm
18.01 % Fe

COMPARTMENT C
1.875 μm
17.94 % Fe

COMPARTMENT D
1.878 μm
17.93 % Fe

FIG. 6c

MULTI-COMPARTMENT ELETROPLATING SYSTEM

FIELD OF THE INVENTION

This invention relates generally to a system designed for electroplating and, more particularly, it relates to a multi-compartment electroplating system having one cathode-paddle-anode assembly per compartment for electroplating multiple wafers simultaneously.

BACKGROUND OF THE INVENTION

The efforts to improve electroplating systems and processes have focused on a variety of concerns. One concern is increased output without sacrificing efficiency and, possibly, increased system efficiency. Another concern is improved uniformity of plating thickness and composition across an individual wafer, from wafer to wafer, and from one electroplating compartment to another. Still another concern is the minimization, if not the elimination, of the potential problems associated with human participation in the electroplating process.

For example, human participation in the electroplating process (e.g., assembling/disassembling the electrodes and paddles after each plating cycle or manually immersing/lifting the group of components with the wafer into/out of a cell) can lead to numerous variations. These variations, particularly speed variations in immersion/removal and immersion-to-start-of-plating dwell time, contribute to non-uniformities in deposit thickness and composition.

Existing systems which have attempted to deal with the above concerns include U.S. Pat. No. 3,652,442 (Powers et al.) which discloses an electroplating cell having a single compartment, discrete anode/cathode/paddle components and a rotary-to-linear motion conversion device as the drive means for its paddle. Some drawbacks of the '442 patent include: First, the '442 patent is capable of electroplating only one wafer at a time. Second, while the cathode holder extends from wall to wall, there is no current deflector to adjust the current variation across the wafer—both the wafer and the cathode holder are powered by one power supply. And, third, discrete components typically require setup, positioning and connecting for each plating cycle which can lead to misalignment, mechanical interference, and open circuits.

An IBM Technical Disclosure Bulletin (TDB), Vol. 23, 201 (1980) by L. Berger, R. Bockel, R. Kronemann and D. Meyer describes an improvement over the '442 patent. The TDB discloses the use of current deflectors and shows how to electroplate multiple wafers at a time in one compartment. However, this system uses four current deflectors for each wafer; therefore, to plate six 47 mm-by-47 mm wafers, it is necessary to use 30 separate power supplies to plate 6 small wafers per compartment (6 power supplies for the six wafers and an additional 4 per wafer for the current deflectors). Experiments reveal that it takes more than a week of empirical testing to determine the correct current to be applied to each deflector and each wafer to minimize the compositional and thickness variations. Despite these time-consuming efforts, the resulting non-uniformities remain large.

U.S. Pat. No. 4,102,756 (Castellani et al.) discloses a method and apparatus for electroplating. The '756 patent focuses on composition and the operation of the permalloy plating bath, pH and iron measurements and adjustments, bath filtration and the locations where the plating solution enters and exits the plating cell. The '756 patent shows, in FIG. 2, the concept of using many wafers per cathode holder but does not describe the use of current deflectors and does not use a separate symmetrical compartment and separate paddle for each wafer.

U.S. Pat. No. 5,078,852 (Yee et al.) discloses a plating rack with a ring-shaped thieving electrode coplanar with the workpiece surface. However, the '852 patent does not disclose a configuration with insulating side walls forming a symmetric compartment. In addition, the '852 patent does not disclose a symmetrically opposing anode, a thieving electrode which occupies all of the rack surface not occupied by the workpiece, individual currents fed to the workpiece and the thief, or an agitation paddle.

SUMMARY OF THE INVENTION

A multi-compartment electroplating system for electroplating at least two objects simultaneously such that the objects are substantially uniform in plating thickness and composition. The system includes a source of electroplating solution and a single multi-compartment tank having at least two separate compartments. Each compartment contains electroplating solution and a cathode-paddle-anode (CPA) assembly. Each CPA assembly includes an anode, a cathode adapted to hold an object and having a single thieving electrode which substantially covers all of said compartment floor not covered by said object, and a paddle. Also included is a paddle drive mechanism for driving all paddles.

BRIEF DESCRIPTION OF THE DRAWINGS

The invention is best understood from the following detailed description when read in connection with the accompanying drawings, in which:

FIG. 3b shows a see-through perspective view of the wafer loading and actuating mechanism of FIG. 3a;

FIGS. 6c shows a table illustrating the uniformity of plating thickness and composition maintained, by the present invention, from compartment to compartment.

DETAILED DESCRIPTION OF THE INVENTION

I. Multi-compartment electroplating system

A. Overview

Figure 1:
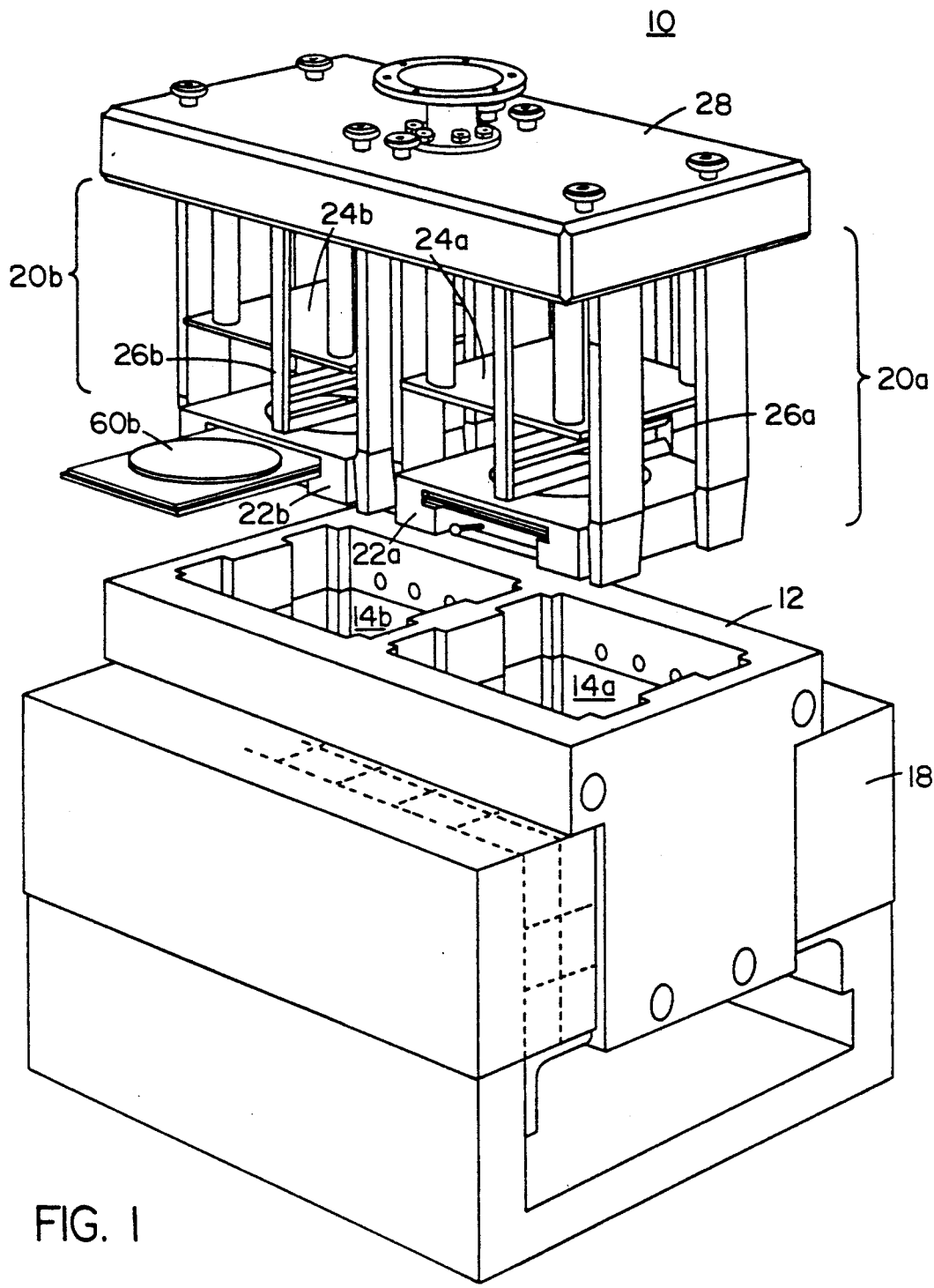
FIG. 1 shows a perspective view of a multi-compartment electroplating system.

FIG. 1 shows a perspective view of a multi-compartment electroplating system 10. System 10 includes a multi-compartment tank 12 positioned between the poletips of a large magnet 18. The relative positioning of tank 12 and magnet 18 is such that one flat surface of an object (i.e., typically a circular wafer 60b) to be electroplated is situated within the maximum field of magnetic flux produced by magnet 18.

Shown suspended above tank 12 and magnet 18 are two cathode-paddle-anode (CPA) assemblies 20a, 20b and a cover assembly 28. Each CPA assembly 20a, 20b, respectively, includes a cathode 22a, 22b, an anode 24a, 24b and a paddle 26a, 26b.

Each cathode 22a, 22b and anode 24a, 24b are precisely constructed so that they fit substantially within the walls of their respective compartments 14a, 14b which provides for highly regular current path from anode 24a to cathode 22a resulting in improved uniformity of plating thickness and composition.

In addition to the improved uniformity, the precision design of the electrodes allows for greater interchangibility of the electrodes compared to prior systems which required extensive characterization of electrode pairs and subsequent dedication of the particular electrode combinations.

Furthermore, CPA assembly 20a is designed so that the electrodes (cathode 22a and anode 24a) and paddle 26a are fixed with respect to each other. In other words, the components of each CPA assembly 20a or 20b maintain the same spatial relationship while entering and/or exiting tank 12 which improves repeatability.

This fixed nature of each CPA assembly 20a minimizes, if not eliminates, the potential for interference or misalignment. Also, the potential of problems (e.g., variability) arising from human participation is minimized so that the extent of the system operator's participation is only to load/unload a wafer into/out of a cathode. A further advantage of the CPA assembly is that the time spent by the cathode immersed in the corrosive electrolyte before the plating current is applied is shorter and more precisely controllable than in the prior art systems, which involve separate loading of anode and cathode.

Figure 2A:
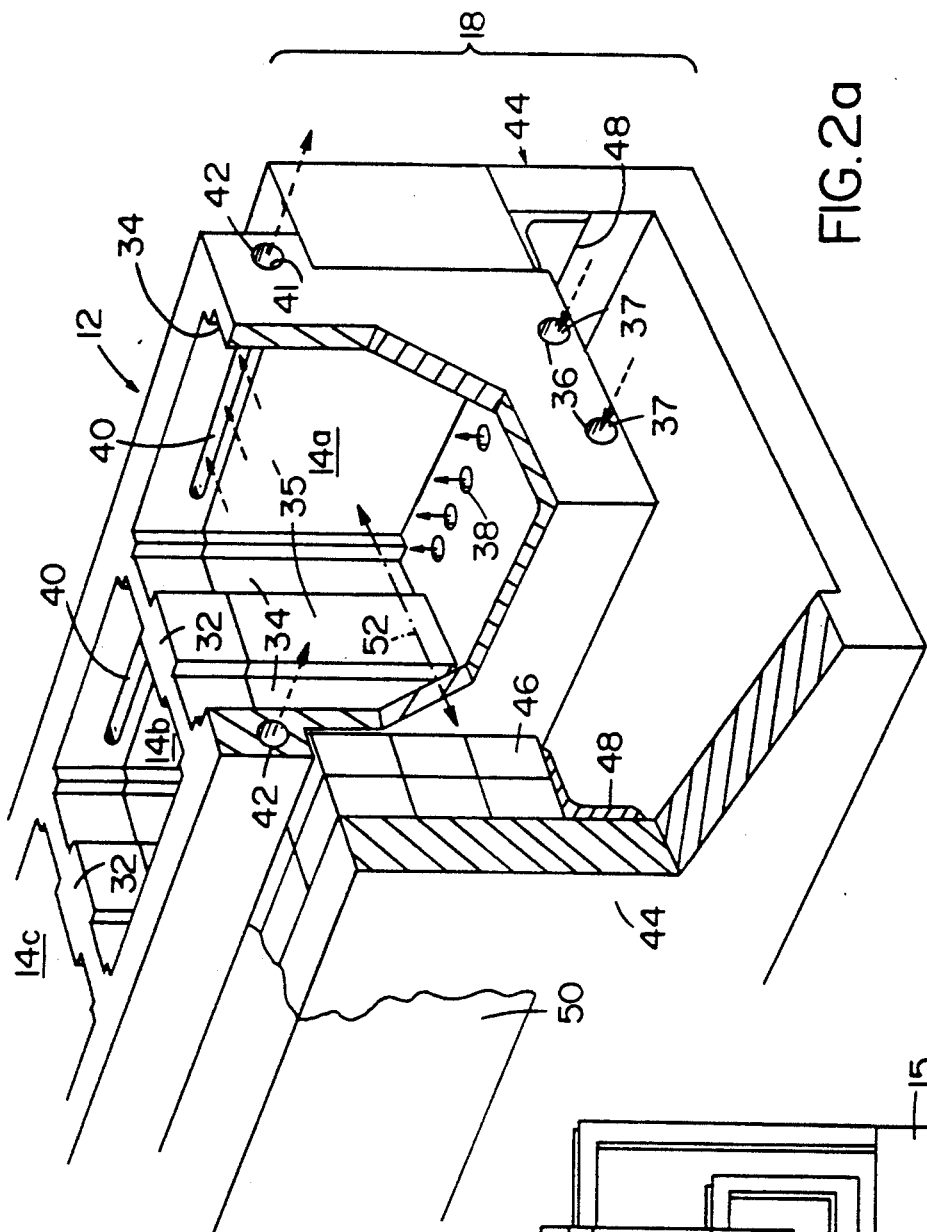
FIG. 2a shows a cutaway perspective view of the multi-compartment tank and the magnet in FIG. 1.

FIG. 1 only shows two compartments 14a and 14b with their respective CPA assemblies 20a and 20b. However, if additional compartments were added (as depicted in FIG. 2a, element 14c) then additional CPA assemblies would also be added.

Shown above CPA assemblies 20a, 20b is the cover assembly 28. Cover assembly 28 houses the paddle drive mechanism which drives all paddles among all individual compartments (details described below with reference to FIG. 5). In the exemplary embodiment of the present invention, the paddle drive mechanism drives all paddles in synchrony.

Because the same paddle drive mechanism drives all paddles 26a, 26b for the individual compartments 14a, 14b in synchrony, a significant improvement in the uniformity of plating thickness and composition from wafers electroplated in one compartment to the next is achieved.

Cover 28 also houses the mounting for the electrodes (cathodes 22a, 22b and anodes 24a, 24b: details described below with reference to FIGS. 3 and 4, respectively); and the electrical connections and wiring for the electrodes (not shown).

The elimination of connectors and cabling by way of internal hardwiring within cover 28 and the individual electrode assemblies improves the overall system reliability and efficiency over prior systems. Many prior systems required that plating operators connect/disconnect the cables after each cycle which, over time, could lead to error, open circuits, short circuits and/or various mechanical problems.

B. Detailed Construction

1. Multi-compartment tank

FIG. 2a shows a cutaway perspective view of tank 12 and magnet 18. Tank 12 has two symmetrical, square-shaped compartments, 14a and 14b. However, the present invention is not limited to two compartments. Increasing the number of compartments in tank 12 is achieved by duplication (FIG. 2a illustrates this concept by showing a portion of a third compartment 14c). A four compartment tank with this configuration has been operated and produced the results shown in FIGS. 6a-6c.

Furthermore, instead of increasing the number of compartments per tank, multi-compartment tank 12 along with its associated support devices (e.g., magnet 18) could be duplicated (i.e., have two multi-compartment tanks for a total of four compartments) and incorporated into an electroplating system. This configuration would require modifications to the paddle drive mechanism in order to achieve synchrony.

Tank 12, in order to create the individual compartments 14a, 14b and 14c, is divided by dividers 32. Dividers 32 are adjustable. For example, if desired, divider 32 between compartments 14a and 14b can be positioned so that there is an opening between compartments 14a and 14b near the floor to permit solution flow between compartments.

However, although solution is permitted to flow between compartments 14a and 14b, by way of either the above divider openings or the plumbing of tank 12 as described below, the electrical resistance between anode 24a and cathode 22a in compartment 14a is much lower than the electrical resistance between compartments 14a and 14b. Thus, current leakage from an individual compartment is reduced to near zero.

Continuing with FIG. 2a, dividers 32 are formed such that there are vertical grooves 34 extending the height of divider 32. It should be noted that, in addition to dividers 32, the end walls of tank 12 also have grooves 34.

Grooves 34, as seen in FIGS. 1 and 2a, facilitate the insertion (in a "piston-like" manner) of cathodes 22a, 22b into compartments 14a, 14b by providing a snug recess for the legs of each cathode 22a, 22b. The result of the cathode legs (shown in FIG. 3) snugly positioned in grooves 34 is a flush, protrusion-free and recession-free wall environment 35 in each compartment between each cathode 22a, 22b and its corresponding anode 24a, 24b during the electroplating process.

Figure 2B:
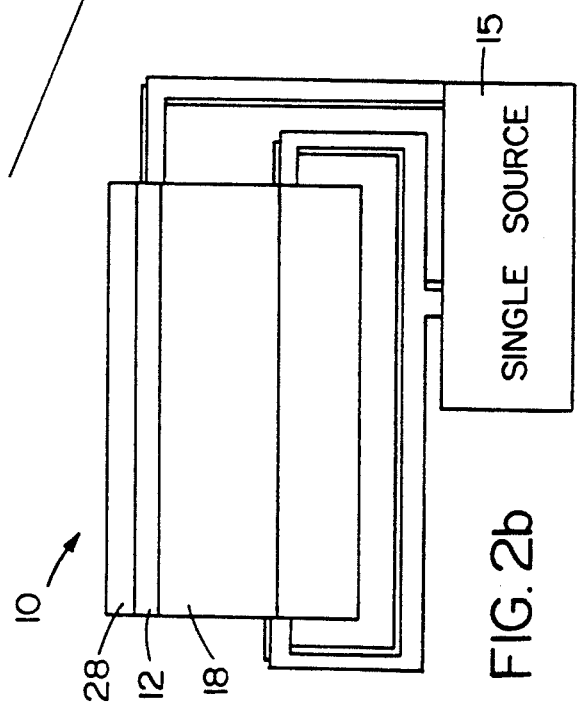
FIG. 2b shows a functional block diagram of the electroplating system of FIG. 1 coupled to a single reservoir of electroplating solution.

Tank 12 also includes input ports 36 which receive electroplating solution from a single reservoir 15 (see FIG. 2b). Using a multi-compartment tank 12 where a single electroplating solution reservoir 15 supplies all compartments can result in an increase in output (i.e., plated parts per day, per space, per equipment cost, per energy cost, per manufacturing manpower, etc.) over single compartment systems.

By way of conduits 37, electroplating solution is carried the length of cell 12. Inlets 38, located on the floor of each compartment, are connected to conduits 37 and are the way by which electroplating solution enters each compartment 14a, 14b. The solution profile (i.e., the flow characteristics of the solution entering input ports 36 and travelling along conduits 37) is set such that the flow into compartments 14a and 14b is substantially equal. Additionally, the agitation due to solution entering compartments 14a, 14b via inlets 38 is minimal.

The electroplating solution exits compartments 14a and 14b by way of outlets 40. Outlets 40, located high on the compartment side walls, are connected to output ports 42 via conduits 41. Conduits 41 extend the length of cell 12, like conduits 37, and carry the solution out of cell 12 returning it to a reservoir (FIG. 2b) by way of gravity. Conduits 41 are slightly declined in the direction of output ports 42 in order for the force of gravity to work.

In the exemplary embodiment, input ports 36, inlets 38 and output ports 42 have a circular shape, while outlets 40 have an eliptical (slot-like) shape; as is known by those skilled in the art, other shapes for input ports 36, inlets 38, outlets 40 and output ports 42 could be used with similar results. Also, input ports 36 are located on both ends of tank 12 to minimize the pressure drop while output ports 42 are located at one end of tank 12 only.

Also, in the exemplary embodiment, tank 12 is constructed of a non-conductive, corrosion resistant material. Tank 12 is designed for complete and easy draining and mounted in a stable, non-vibrating base. The interior walls of tank 12 which form compartments 14a and 14b have a four percent taper to assist cathode entry.

2. Magnet

Also shown in FIG. 2a is magnet 18. Magnet 18 is designed such that it provides an axis-orienting magnetic field, represented by dotted line 52, during the electroplating process. Also shown is yoke 44. Within yoke 44 are two arrays of magnetic blocks 46 which create the necessary North and South poles. Magnetic blocks 46 are properly positioned (i.e., the object to be electroplated is in maximum concentration of magnetic flux) and supported by angle brackets 48. Covering and protecting yoke 44 and magnetic blocks 46 is a stainless steel cap 50.

In the exemplary embodiment, yoke 44 is constructed of soft iron and magnetic blocks 46 are constructed of neodymium iron. Alternatively, magnetic blocks 46 could be constructed from barium ferrite or SmCo. A further alternative is an electromagnet of suitable size, magnetic field strength and flux distribution.

The depth of soft iron yoke 44 relative to the separation of the poletips is selected to provide the desired magnetic flux concentration. Furthermore, if permanent magnets are used, they can be modular with each magnet module being the length of one compartment.

It should be noted that the present invention can be used for applications other than producing magnetic heads (e.g., copper or gold coils and studs), in which case, there would be no need for magnet 18.

3. Cathode

Figure 3A:
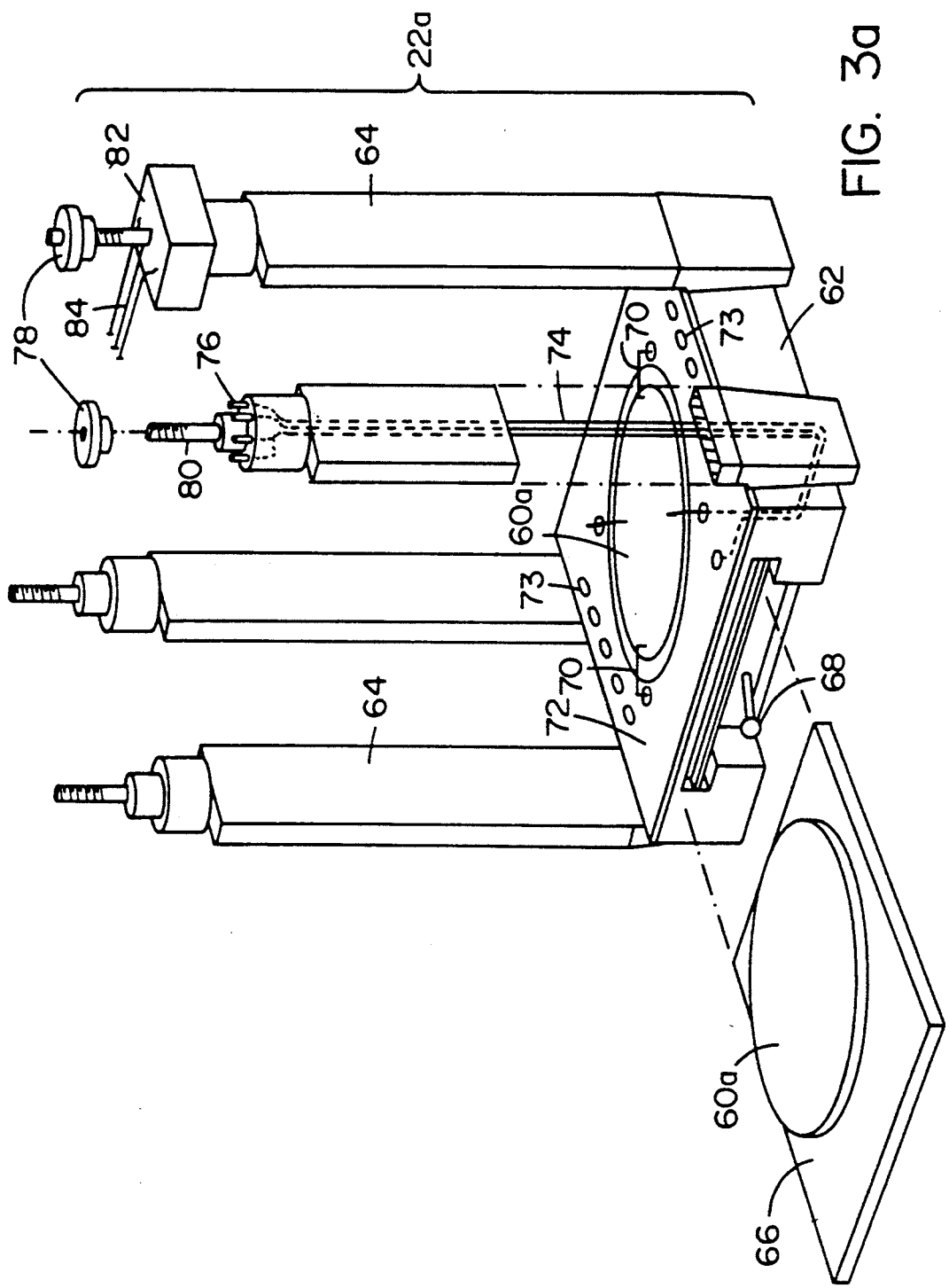
FIG. 3a shows a perspective view of one of the cathodes used in the system of FIG. 1.

FIG. 3a shows a perspective view of the cathode 22a used in CPA assembly 20a. Cathode 22a is an electrode that also functions as a holding fixture: it holds the object to be electroplated which, in the present case, is a circular wafer 60a.

In the exemplary embodiment, wafer 60a is constructed from a ceramic material having a circular shape, however, most any symmetrical shape (e.g., circular, square, etc) can be used. It should be noted that the material makeup of wafer 60a is not limited to ceramic material because cathode 22a is equipped to handle either thick $Al_2O_3.TiC$ ceramic substrates or thin Si or glass wafers: top surface contact is provided for Si or glass and back electrical contact is provided for $Al_2O_3$.-TiC ceramic.

Additionally, the present invention is designed to operate in connection with either NiFe, CuCo, CoFe, CoFeCu, CuNiFe, Cu, Au or other appropriate plating materials of the like known by those skilled in the art; however, it is especially effective with alloys (e.g., NiFe, CuCo, CuNiFe, etc.).

Referring back to FIG. 3a, cathode 22a includes a base 62 and four legs 64. Because cathode 22a fits snugly within grooves 34 of the compartment dividers 32, the inside surface of cathode legs 64 become portions of the compartment walls during the electroplating process. As mentioned, this results in a flush, protrusion-free and recession-free wall environment.

The plating surface of cathode 22a is symmetrical (square) and extends from wall-to-wall such that it fits substantially within the compartment. Also, in the exemplary embodiment, the lower fifty millimeters of the cathode legs 64 have a four percent taper to assist alignment of the cathode into the tank compartments.

The cathode-to-compartment relationship features (i.e., cathode legs 64 fitting snuggly and flushly into divider grooves 34 and the wall-to-wall configuration) provide improvements in plated film uniformity over prior system configurations. The improvements include better control and predictability over plating thickness; increased plating thickness uniformity across an individual wafer and from wafer to wafer; and elemental composition control in plated alloy films.

Referring back to FIG. 3a, wafer 60a sits in tray 66 which slides into a slot in cathode base 62. Once tray 66 is inside base 62, lever 68 is turned to move tray 66 and wafer 60a upward thus securing it in contact with electrical contacts 70. In this position, wafer 60a is coplanar with thieving electrode 72 which is mounted to the top of cathode base 62.

Thieving electrode 72 extends substantially from wall-to-wall, covering all of the compartment floor except for the section covered by wafer 60a and a narrow gap around thieving electrode 72. This narrow gap around thieving electrode 72 allows solution to rise from the compartment floor and fill compartment 14a. Also, thieving electrode 72 can be constructed with peripheral perforations 73 to provide additional means for the electroplating solution to rise and fill compartment 14a.

A thin cover throw away sheet (not shown) may also be used with thieving electrode 72. This sheet, which is placed on top of thieving electrode 72, is approximately 5 to 10 mils and improves contact while reducing scraping or etching problems after several platings.

Figure 3B:
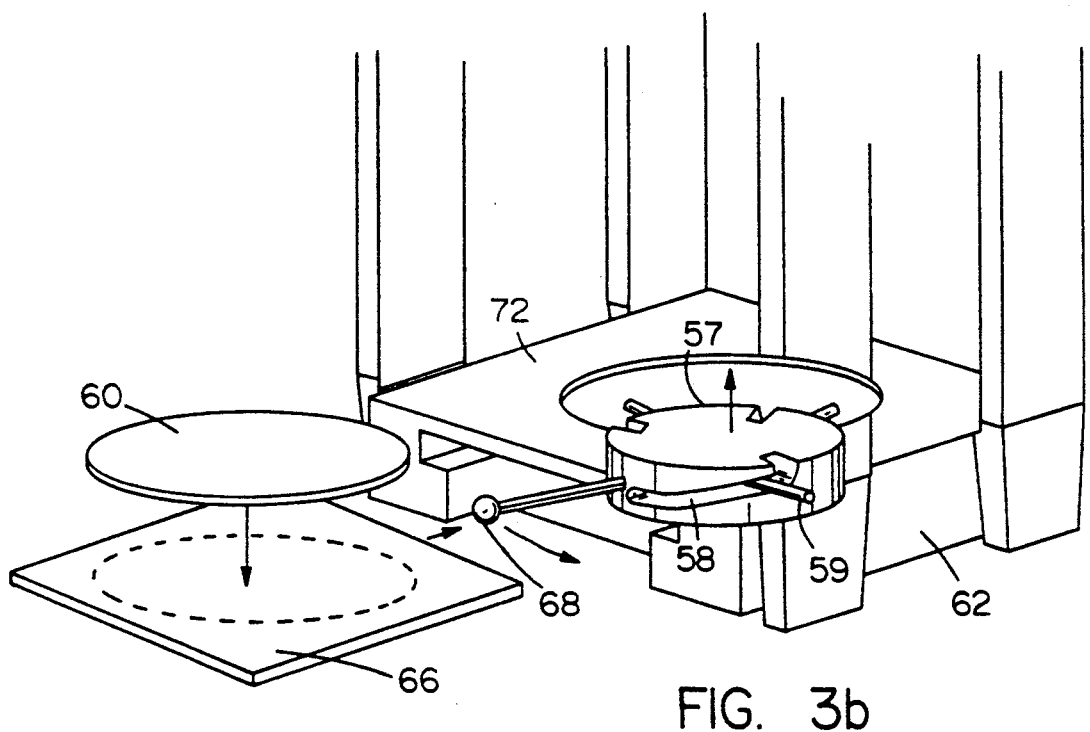

FIG. 3b shows the wafer loading and actuating mechanism linked to lever 68. As lever 68 is moved to the right, horizontally-oriented disk 57, along with tray 66 and wafer 60a, moves upward as a result of three helical slots 58 riding three fixed shafts 59. In the exemplary embodiment, slots 58 have 120° spacing. And, when lever 68 is moved to the left, the process is reversed such that helical slots 58 ride shafts 59 down, thus, lowering disk 57. It should be noted that lever 68 also rides along a helical ramp (not shown) machined in the cathode base 62. The helical ramp provides support for lever 68 and includes a detent notch at the end-of-travel to hold lever 68 and disk 57 in place.

Referring back to FIG. 3a, electrical current is supplied from two external power supplies (not shown) to electrical contacts 70 and to thieving electrode 72, respectively, via internal cathode wiring 74 which, as represented by dotted lines, resides within cathode base 62 and cathode legs 64. The internal cathode wiring 74 within base 62 and at base/leg 62/64 interface is sealed against intrusion by the plating electrolyte (not shown).

Cathode wiring 74 is connected to male electrical connectors 76 located near the end of cathode leg 64. In the exemplary embodiment, cathode wiring 74 is contained in only two of the four cathode legs 64. The male electrical connectors 76 mate with female connectors (not shown) in a contact block 82 inside the cover. Contact block 82 is not considered part of cathode 22a, but is shown to illustrate the means of current transmission at this particular interface.

Contact block 82 is connected to an external power source (not shown) via wiring 84 and other cabling (not shown) which reside within cover 28. Cathode 22a is mechanically fastened to cover 28 by thumbnuts 78 on threaded studs 80 at the top of the cathode legs 64.

4. Anode

Figure 4:
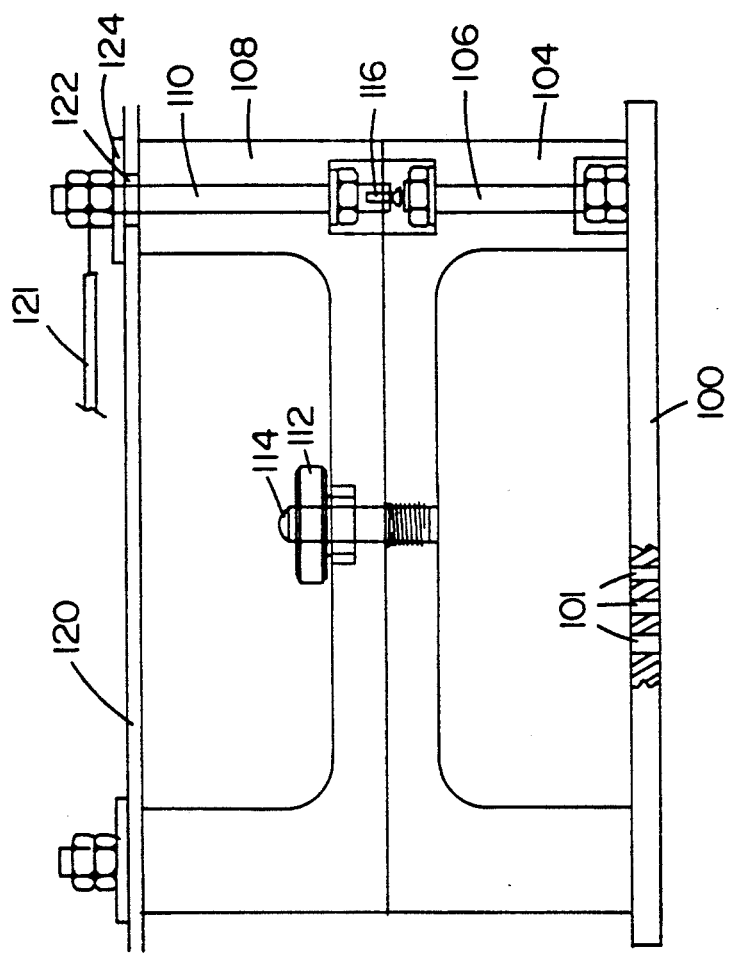
FIG. 4 shows an orthographic view of one of the anodes used in the system of FIG. 1.

FIG. 4 shows a orthographic view of an anode 24a which is connected to the cover's base 120. Included in anode 24a is an anode plate 100 and its associated attachment and conducting devices. Anode plate 100 is designed such that it fits substantially within an individual compartment's walls, yet with sufficient space provided between anode plate 100 and the compartment's walls for the thin paddle legs (shown in FIG. 5). Because anode plate 100 fits substantially within the compartment walls, it forms a cover over the compartment to minimize evaporation and splash.

In the exemplary embodiment of the present invention, anode plate 100 is constructed of a high purity metal like pure nickel. Additionally, anode plate 100 is perforated with a matrix of small holes 101 to permit the flow through of electroplating solution and to prevent the entrapment of gases (e.g., air or $H_2$), thus, allowing efficient entry/exit to/from the solution-filled compartment.

Anode plate 100 is connected to a lower attachment bracket 104 and lower conductor 106. Lower bracket 104 and lower conductor 106 are mechanically connected to an upper bracket 108 and an upper conductor 110 by way of thumbnut 112 and threaded stud 114. The lower and upper conductors 106 and 110 are electrically connected via male electrical connector 116.

The same external power supply that powers cathode 22a supplies the necessary electrical current to anode plate 100 by way of anode wiring 121 housed by cover assembly 28. In the exemplary embodiment of the present invention, upper conductor 110 is electrically insulated from cover base 120 by an O-ring 122 and a dielectric disk 124.

5. Paddles

Figure 5:
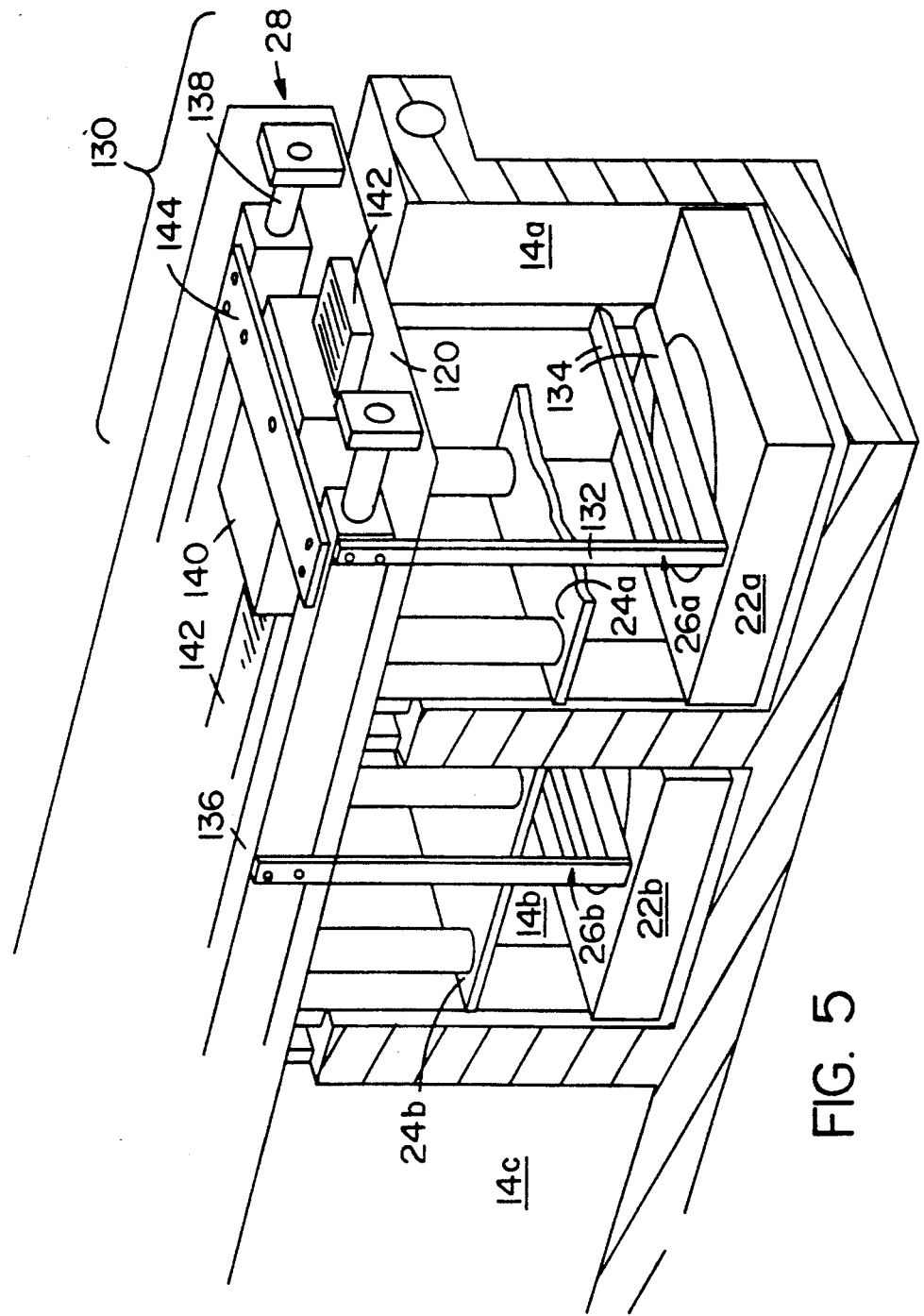
FIG. 5 shows a cutaway perspective view of the multi-compartment tank of FIG. 1 with particular attention to the paddles and their associated drive mechanism.

FIG. 5 shows a perspective view of tank 12 with particular emphasis on illustrating paddles 26a, 26b and paddle drive mechanism 130 housed within cover assembly 28.

Each paddle 26a and 26b comprises two thin vertical legs 132 and two horizontal triangular-shaped paddle blades 134. Paddle legs 132 are very thin and very close to the walls of the compartment so that they do not affect the agitation of fluid in the compartment. An alternative shape for blades 134 is half-cylinders (experiments show the resulting agitation for the two blade shapes is substantially the same); however, regardless of shape, it should be noted that the distance from the base of one paddle blade 134 to the other (i.e., distance between horizontally parallel faces) is in the range of $\frac{1}{4}$ to $\frac{1}{2}$ the total distance from anode 24a to cathode 22a. In the exemplary embodiment, this distance is approximately $\frac{1}{3}$.

Each paddle leg 132, at its upper end, is secured to parallel sliding blocks 136 which travel along parallel rods 138. Because an important feature of the present invention is that paddle 26a be rigidly suspended, an alternative means of suspension for paddle 26a comprises bearings riding on rigid rails.

Sliding blocks 136 and, consequently, paddles 26a and 26b are driven by linear motor 140 that traverses platten 142 which is secured to cover base 120. Sliding blocks 136 are connected to linear motor 140 by linkage plate 144. When linear motor 140 is operating, it, along with the rest of the paddle drive mechanism, causes paddles 26a and 26b to sweep back and forth along the length of compartment 14a in between anode 24a and cathode 22a creating an agitation turbulence in the electroplating solution.

In the exemplary embodiment of the present invention, the speed profile, via linear motor 140, of paddles 26a and 26b is programmable. Also, because all paddles 26a and 26b are connected to the same sliding blocks 136 which are driven by a single linear motor 140, all paddle motion is synchronized with respect to each other. An important result of synchronized paddle motion is that the resulting agitation in compartments 14a and 14b is substantially identical. This is another factor contributing to improved uniformity in plating thickness and composition.

Because the desired result of the paddle motion is substantially identical agitation among all compartments, an alternate drive mechanism employing more than one linear motor can be used as long as the resulting motion of the paddles is substantially synchronized.

It should be noted that the use of a single linear motor 140 is an improvement in simplicity, packaging, space and weight over prior systems that used rotary motor driven slider-crank mechanisms or lead screw devices to convert rotary motion into linear motion. The motor is housed in the cover assembly 28 which covers the cell and maintains an environment inside the tank free of chemical and particulate contamination.

C. Operation and Us

The operation of the multi-compartment electroplating system 10 is described below with reference to FIGS. 1, 2a, 2b, 3 and 5. For the purpose of presenting a clear description of operation, the description focuses on compartment 14a only with its associated CPA assembly 20a, cover assembly 28 and wafer 60a. The use and operation described with respect to compartment 14a can be duplicated for any additional compartments contained in multi-compartment tank 12 since each compartment and associated CPA assembly is identical.

In operation, while CPA assembly 20a is suspended above tank 12, wafer 60a is loaded onto its respective tray 66. In the exemplary embodiment of the present invention, the suspension of CPA assembly 20a along with cover 28 is accomplished with a automated crane (not shown) which can be programmed to lift or lower the assemblies as desired.

Once loaded, tray 66 is slid into its respective cathode base 62. Lever 68 located on base 62 is turned such that tray 66 and, consequently, wafer 60a is raised to the same plane as thieving electrode 72 and secured in position.

Prior to lowering CPA assembly 20a, complete with wafer 60a in place, into its respective compartment 14a, a computer controlled cathode test algorithm is run to verify that all electrical connections are made with no open circuits or short circuits. Also, prior to lowering, compartment 14a should contain electroplating solution (not shown).

It should be noted that compartment 14a constantly contains electroplating solution. The single reservoir 15 continuously supplies solution to input ports 36 which, via conduits 37, leads to inlets 38 located on the floor of each compartment 14a. The solution, via inlets 38, enters compartment 14a and continues to provide compartment 14a with fresh solution. Near the top of compartment 14a, once it reaches outlets 40, the solution spills through outlets 40 into conduits 41 which, by way of gravity, carry the solution down to output ports 42 and finally to the reservoir 15. Furthermore, the volumetric flow of solution while circulating to each compartment is the same and relatively small such that it does not interefere with the convective pattern produced by its paddle.

While compartment 14a contains electroplating solution, the CPA assembly 20a is lowered into its respective compartment 14a. In particular, the legs 64 of the cathode 22a slide snuggly down grooves 34 of dividers 32 until securely in place. As CPA assembly 20a is lowered, the electroplating solution (already in the compartment) flows through the small holes in the anode plate 100 for efficient entry (as well as exit). Once CPA assembly 20a is in place, the result is that compartment 14a has flush, protrusion-free and recession-free walls from at least cathode 22a to anode 24a.

At this point, external power supplies (not shown) supplying current to cathode 22a, anode 24a and thieving electrode 72 initiate the electroplating process. The current supplied to thieving electrode 72 can be modified to compensate for variations across wafer 60a.

As the current is supplied, linear motor 140, connected to the paddle drive mechanism, is also activated. The linear motor 140 traverses platten 142 which, in turn, moves sliding blocks 136 along parallel rods 138 and, consequently, causes paddle 26a to sweep back and forth over wafer 60a between anode 24a and cathode 22a. This process continues for a predetermined period which allows for the desired uniformity of thickness and composition of the deposited film on wafer 60a.

Finally, the current supplied to the electrodes is terminated, linear motor 140 is turned off and CPA assembly 20a (including cover assembly 28) is lifted and removed from its respective compartment 14a by the crane. After being removed from the solution, CPA assembly 20a with wafer 60a is immersed in a rinse tank (not shown) filled with water and then removed. After CPA assembly 20a is rinsed and removed, lever 68 is turned to release and lower tray 66, tray 66 is slid out from the base 62 and the electroplated wafer 60a is removed.

Although the exemplary embodiment of the present invention shows CPAC assemblies 20a, 20b connected by cover assembly 28, under certain circumstances it may be desirable to remove one CPA assembly at a time (i.e., CPA assembly 20a and not CPAC assembly 20b). Thus, CPA assemblies 20a, 20b could be separately lowered/lifted to/from tank 12, albeit individual cover assemblies and modifications to the paddle drive mechanism would be needed (i.e., one solution being substantially synchronized individual linear drive motors).

Additionally, although the present invention shows cathode 22a and anode 24a fixed with respect to each other, under certain circumstances it may be desirable to have electrodes which are not fixed with respect to each other thereby allowing the separate removal of anodes 24a, 24b and cathodes 22a, 22b.

D. Performance Charts

Figure 6A:
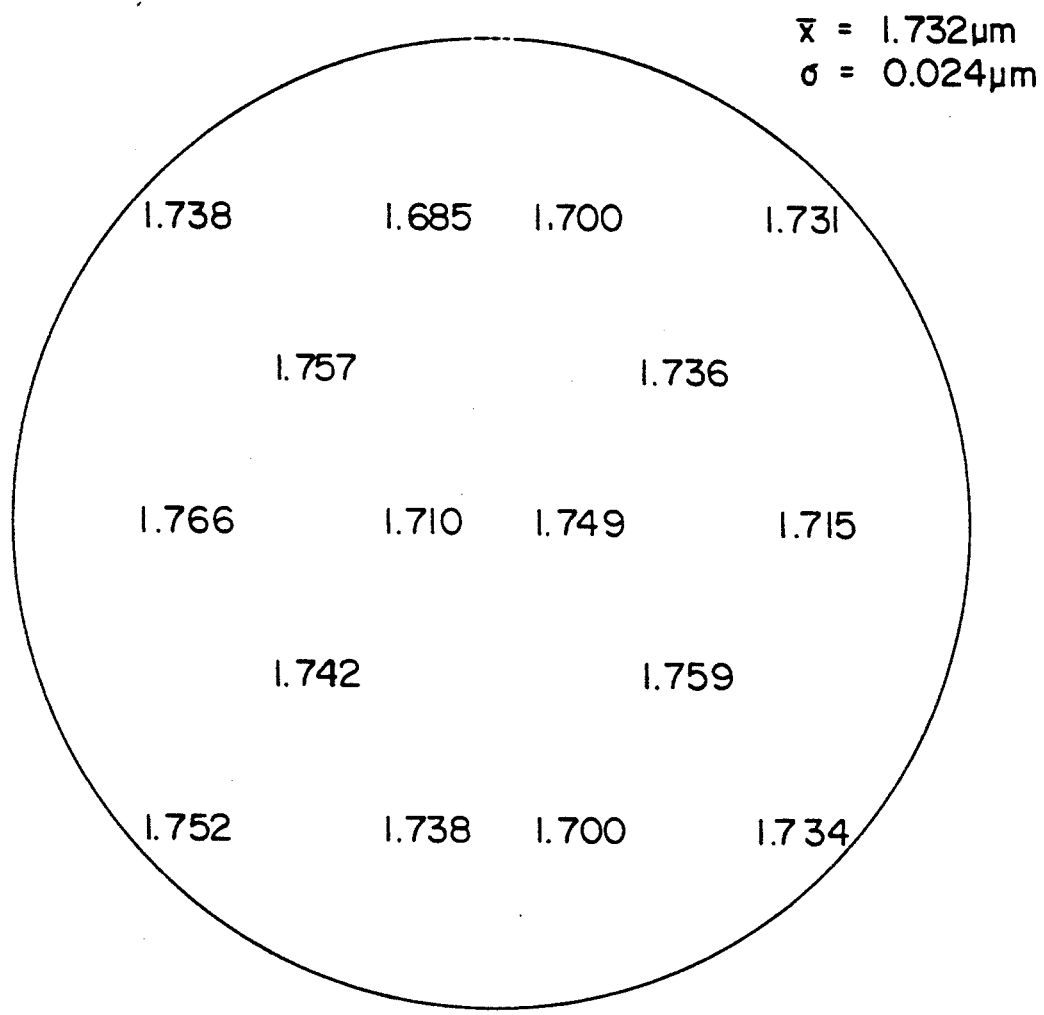
FIGS. 6a shows a graph illustrating the uniformity of plating thickness across a patterned wafer using the present invention.
Figure 6B:
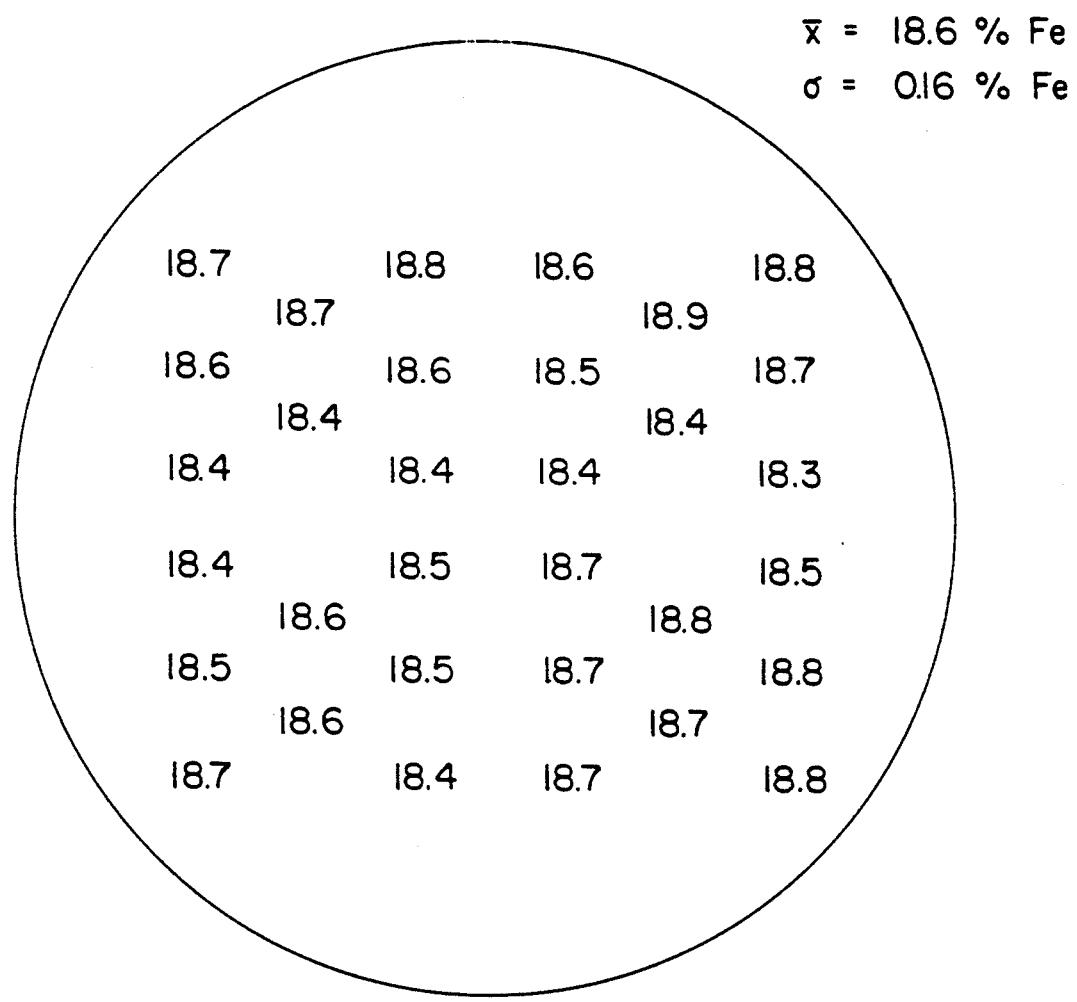
FIGS. 6b shows a graph illustrating the uniformity of plating composition across a wafer electroplated plated by the present invention.

FIGS. 6a through 6c illustrate the improvements achieved in the uniformity o plating thickness and composition across a wafer and from compartment to compartment, respectively, by an electroplating system employing the present invention.

FIG. 6a shows a graphic illustrating the substantially uniform plating thickness across an individual wafer plated using the present invention. It should be noted that for FIG. 6a "x" represents the mean thickness and "$\sigma$" represents the standard deviation.

FIG. 6b shows a graphic illustrating the substantially uniform plating composition across an individual wafer plated using the present invention. It should be noted that for FIG. 6b "x" represents the mean percent composition and "$\sigma$" represents the standard deviation.

FIG. 6c shows a table of plating thicknesses and compositions for four consecutively plated wafers in four different compartments using the same CPAC assembly.

Although the invention is illustrated and described herein embodied as a multi-compartment electroplating system, the invention is nevertheless not intended to be limited to the details as shown. Rather, various modifications may be made in the details within the scope and range of equivalents of the claims and without departing from the spirit of the invention.

What is claimed:

1. A multi-compartment electroplating system for simultaneously electroplating at least two objects comprising:
   a source of electroplating solution;
   a single multi-compartment tank comprising:
      at least two separate compartments each for containing electroplating solution and a cathode-paddle-anode (CPA) assembly, each of said compartments having a floor and four walls;
   each of said CPA assemblies comprising:
      an anode;
      a cathode adapted for receiving and holding one of said objects and having a single thieving electrode, said thieving electrode covers substantially all of said compartment floor not covered by said object;
      agitation means for generating agitation in said electroplating solution; and
      means for driving all of said agitation means within said compartments,
      whereby said objects exhibit substantial uniformity of plating thickness and composition.

2. The system of claim 1 wherein said means for driving drives all of said agitation means in synchrony.

3. The system of claim 2 wherein said means for driving is a single linear-drive motor.

4. The system of claim 2 wherein said means for driving is a plurality of linear drive motors and wherein each motor drives a separate agitation means.

5. The system of claim 3 further comprising cover means for covering all of said compartments and for housing said linear drive motor.

6. The system of claim 4 wherein said CPA assembly further comprises cover means for covering the respective compartment and for housing the respective motor.

7. The system of claim 1 wherein said agitation means is a paddle having two blades and wherein said distance between the bases of said paddle blades is between ¼ and ½ the distance from said anode to said cathode and wherein the agitation generated by said paddle is highly uniform.

8. The system of claim 7 wherein said paddle blades are triangular shaped.

9. The system of claim 8 wherein said paddle blades are half-cylinder shaped.

10. The system of claim 1 wherein said anode and said cathode fit substantially within said walls of their respective compartment.

11. The system of claim 10 wherein each of said at least two individual compartments is symmetrical and each of said anodes is symmetrical.

12. The system of claim 11 wherein said anode is perforated to prevent entrapment of gases while allowing throughflow of solution.

13. The system of claim 1 wherein said thieving electrode and said object receive electrical current from two separate power supplies.

14. The system of claim 13 wherein said thieving electrode covers all of said compartment floor not covered by said object except for a very narrow gap around the thieving electrode and a very narrow gap between the thieving electrode and the object.

15. The system of claim 14 wherein said thieving electrode has small peripheral perforations, wherein said thieving electrode is symmetrical and wherein said thieving electrode is coplanar with said object.

16. The system of claim 15 wherein both the narrow gap around the thieving electrode and the small peripheral perforations in the thieving electrode together provide a passage for said solution to rise in said compartment, said perforations being circular.

17. The system of claim 1 wherein said multi-compartment tank is constructed having an electrical resistance between compartments which is much greater than the electrical resistance between respective anodes and cathodes to prevent current leakage.

18. The system of claim 1 further comprising means for circulating electroplating solution among said compartments and said source.

19. The system of claim 18
wherein said agitation means includes means for producing a convective pattern in each compartment,
wherein said means for circulating includes input ports and conduits producing a volumetric flow (1) into each compartment of sufficiently small size to not interfere with the convective pattern produced by said agitation means, and
(2) which is substantially equal in each compartment.

20. The system of claim 1 wherein said walls of each compartment are flush, protrusion-free and recession-free from at least said cathode to said anode.

21. The system of claim 1 wherein said source is a single reservoir.

* * * * *